United States Patent
Okajima et al.

(10) Patent No.: US 11,047,282 B2
(45) Date of Patent: Jun. 29, 2021

(54) EXHAUST GAS PURIFICATION DEVICE

(71) Applicants: N.E. CHEMCAT CORPORATION, Tokyo (JP); National Agency for Automobile and Land Transport Technology, Tokyo (JP)

(72) Inventors: Toshinori Okajima, Tokyo (JP); Makoto Nagata, Tokyo (JP); Nobunori Okui, Tokyo (JP); Kyohei Yamaguchi, Tokyo (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 29 days.

(21) Appl. No.: 16/482,310

(22) PCT Filed: Feb. 8, 2018

(86) PCT No.: PCT/JP2018/004392
§ 371 (c)(1),
(2) Date: Jul. 31, 2019

(87) PCT Pub. No.: WO2018/147369
PCT Pub. Date: Aug. 16, 2018

(65) Prior Publication Data
US 2020/0003098 A1   Jan. 2, 2020

(30) Foreign Application Priority Data

Feb. 9, 2017  (JP) .............................. JP2017-022372
Mar. 29, 2017 (JP) .............................. JP2017-066063

(51) Int. Cl.
*F01N 3/20* (2006.01)

(52) U.S. Cl.
CPC ........... *F01N 3/208* (2013.01); *F01N 3/2013* (2013.01); *B01D 2251/2067* (2013.01);
(Continued)

(58) Field of Classification Search
CPC .... F01N 3/208; F01N 3/2013; F01N 2560/06; F01N 2570/14; F01N 2570/18;
(Continued)

(56) References Cited

U.S. PATENT DOCUMENTS 8,413,423 B2 * 4/2013 Roos ................... F01N 13/0097
60/284
2007/0180816 A1 * 8/2007 Masuda .................. F01N 3/106
60/274
(Continued)

FOREIGN PATENT DOCUMENTS

JP          08131840 A  *  5/1996
JP        2015508864 A      3/2015
(Continued)

OTHER PUBLICATIONS

International Search Report (English version) dated May 1, 2018 for PCT/JP2018/004392.

*Primary Examiner* — Matthew T Largi
(74) *Attorney, Agent, or Firm* — Bacon & Thomas, PLLC (57) ABSTRACT

An exhaust gas purification device is capable of reducing the amount of NOx emissions generated at the time of cold start. An exhaust gas purification device includes a urea injection valve, a metal honeycomb, a temperature sensor, and an SCR catalyst in an exhaust passage. It is possible for an exhaust gas temperature of exhaust gas passing through the metal honeycomb to be increased by the metal honeycomb that is capable of being electrically heated by control executed by a control unit ECU. The exhaust gas temperature is detected by the temperature sensor. Based on a temperature-versus-ammonia adsorption amount profile stored in advance in a storage unit of the control unit ECU, ammonia is pre-adsorbed onto the metal honeycomb and the SCR catalyst, and the metal honeycomb is electrically heated at the time of cold start after the temperature detected by the temperature sensor becomes lower than 150° C.

12 Claims, 6 Drawing Sheets

(52) U.S. Cl.
CPC ...... *F01N 2560/06* (2013.01); *F01N 2570/14* (2013.01); *F01N 2570/18* (2013.01)

(58) Field of Classification Search
CPC .... F01N 3/0814; F01N 3/2006; F01N 3/2026; B01D 2251/2067
See application file for complete search history.

(56) References Cited

U.S. PATENT DOCUMENTS

| | | | |
|---|---|---|---|
| 2010/0300080 A1* | 12/2010 | Peters | F01N 13/141 |
| | | | 60/297 |
| 2013/0111886 A1* | 5/2013 | Gonze | F01N 3/2033 |
| | | | 60/286 |
| 2014/0366509 A1 | 12/2014 | Hirth et al. | |
| 2015/0184567 A1* | 7/2015 | Yamashita | B01D 53/94 |
| | | | 60/286 |
| 2016/0250592 A1* | 9/2016 | Yoshikawa | F01N 3/2066 |
| | | | 422/111 |
| 2016/0281570 A1* | 9/2016 | Mori | F01N 3/2026 |
| 2018/0274419 A1* | 9/2018 | Sakuma | B01D 53/9409 |
| 2019/0032533 A1* | 1/2019 | Solbrig | B01J 21/04 |

FOREIGN PATENT DOCUMENTS

| | | |
|---|---|---|
| JP | 2016217301 A | 12/2016 |
| WO | 2013183153 A1 | 12/2013 |

\* cited by examiner

EXHAUST GAS PURIFICATION DEVICE

The present invention relates to an exhaust gas purification device that purifies exhaust gas emitted from an internal combustion engine of an automobile or other vehicles, and particularly relates to an exhaust gas purification device including a urea Selective Catalytic Reduction (SCR) system for purifying nitrogen oxide (NOx) contained in exhaust gas from a diesel engine.

BACKGROUND OF THE INVENTION

A urea SCR system for purifying NOx contained in exhaust gas emitted from an internal combustion engine of an automobile or other vehicles is being developed. The urea SCR system employs an SCR catalyst that adsorbs ammonia produced by hydrolysis of urea. The urea SCR system causes NOx to chemically react with the ammonia on the SCR catalyst to be purified into nitrogen and water.

In order that the urea SCR system causes ammonia to be adsorbed onto the SCR catalyst, the temperature of the SCR catalyst needs to be controlled so as to become equal to or higher than the temperature at which the hydrolysis of urea occurs. Thus, temperature control on the SCR catalyst has been attempted using an electrically-powered heater, an Electrically Heated Catalyst, and the like.

For example, Patent Literature 1 discloses a control method in which, based on the operational state of an exhaust gas treatment device, an electrical heater is activated or deactivated by using a periodic frequency so as to inhibit generation of deposits on the electrical heater or remove the deposits from the electrical heater to thereby minimize an increase in back pressure and a decrease in heating efficiency. Patent Literature 2 discloses a control method to improve fuel efficiency in a urea SCR system including an electrical heater.

CITATION LIST

Patent Literature

Patent Literature 1
National Publication of International Patent Application No. 2015-508864
Patent Literature 2
International Publication No. WO 2013/183153

SUMMARY OF INVENTION

Technical Problem

In recent years, there has been a requirement for a further reduction in amount of NOx emissions. Especially, a urea SCR system does not inject urea under the low-temperature condition where hydrolysis of urea does not occur due to the reasons such as a possible occurrence of injector clogging. Consequently, a large amount of NOx is emitted, for example, at the time of cold start after the engine stop, or at the time of low-load start at which the exhaust gas temperature during real driving or within the low-temperature range in the first half of the World-wide Harmonized Transient Cycle (WHTC) mode is below 150° C. (hereinafter, these times are collectively referred to as "the time of cold start").

The present invention has been made in view of the above problems. That is, an object of the present invention is to provide a novel exhaust gas purification device that is capable of reducing the amount of NOx emissions generated at the time of cold start.

SUMMARY OF THE INVENTION

The present inventors have earnestly examined the above problems to be solved. As a result of this, the present inventors have found that the above problems can be solved by causing a predetermined amount of ammonia to be adsorbed in advance onto at least an electrically-heated metal honeycomb, and electrically heating the electrically-heated metal honeycomb at the time of cold start, thus leading to completion of the present invention.

That is, the present invention provides various specific aspects described below.

(1) An exhaust gas purification device at least comprising: an exhaust passage through which exhaust gas from an engine passes; a urea injection valve that injects urea into the exhaust passage; an SCR catalyst provided in the exhaust passage on a downstream side of the urea injection valve; an electrically-heated metal honeycomb provided in the exhaust passage on a downstream side of the urea injection valve and on an upstream side of the SCR catalyst, and capable of increasing an exhaust gas temperature; a temperature sensor that detects an exhaust gas temperature of exhaust gas passing through the electrically-heated metal honeycomb; a storage unit having stored therein a temperature-versus-ammonia adsorption amount profile for the electrically-heated metal honeycomb and the SCR catalyst; and a control unit that calculates an injection amount In of the urea, which is equivalent to an amount of ammonia to be pre-adsorbed onto the electrically-heated metal honeycomb and the SCR catalyst, based on the temperature-versus-ammonia adsorption amount profile, injects a calculated amount of the urea from the urea injection valve to cause ammonia to be pre-adsorbed onto the electrically-heated metal honeycomb and the SCR catalyst, and electrically heats the electrically-heated metal honeycomb at a time of cold start after the exhaust gas temperature becomes lower than 150° C.

(2) The exhaust gas purification device according to (1), wherein the control unit electrically heats the electrically-heated metal honeycomb until the exhaust gas temperature falls within a temperature range from a predetermined set temperature $T_1$° C. or higher to a predetermined set temperature $T_2$° C. or lower.

(3) The exhaust gas purification device according to (1) or (2), wherein the control unit stops electrically heating the electrically-heated metal honeycomb when the exhaust gas temperature exceeds a predetermined set temperature $T_3$° C.

(4) The exhaust gas purification device according to (3), wherein the set temperatures satisfy a relationship of $T_1 < T_3 \leq T_2$.

(5) The exhaust gas purification device according to any one of (1) to (4), wherein the electrically-heated metal honeycomb at least includes a metal honeycomb, and an SCR catalyst supported by the metal honeycomb.

(6) The exhaust gas purification device according to any one of (1) to (5), wherein the electrically-heated metal honeycomb at least includes a metal honeycomb, and a jacket-type electrical heater attached to the metal honeycomb and/or a coil-type electrical heater partially embedded into the metal honeycomb.

(7) The exhaust gas purification device according to any one of (1) to (6), wherein the electrically-heated metal honeycomb at least includes a metal honeycomb, and a heating control unit that energizes the metal honeycomb to cause the metal honeycomb to generate heat.

(8) The exhaust gas purification device according to any one of (1) to (7), wherein the control unit executes preheating control to increase the exhaust gas temperature when the exhaust gas temperature is below the predetermined set temperature $T_1$ at a time of the pre-adsorption.

(9) The exhaust gas purification device according to any one of (1) to (8), wherein the control unit executes preheating control to electrically heat the electrically-heated metal honeycomb so as to increase the exhaust gas temperature when the exhaust gas temperature is below the predetermined set temperature $T_1$ at a time of the pre-adsorption.

(10) The exhaust gas purification device according to any one of (1) to (9), wherein the control unit reads a maximum ammonia adsorption amount Ad for the electrically-heated metal honeycomb and the SCR catalyst at a predetermined set temperature Tg° C. from the storage unit, and calculates a urea amount equivalent to 30 to 100% of the maximum ammonia adsorption amount Ad as the injection amount In.

(11) The exhaust gas purification device according to any one of (1) to (10), wherein the exhaust passage is provided with a heat-insulating material on an outer periphery of the exhaust passage at least on a downstream side of the urea injection valve and on an upstream side of the SCR catalyst.

(12) The exhaust gas purification device according to any one of (1) to (11), further comprising a second temperature sensor that detects an exhaust gas temperature of exhaust gas flowing into the electrically-heated metal honeycomb on an upstream side of the electrically-heated metal honeycomb, wherein when the electrically-heated metal honeycomb is electrically heated, the control unit performs pre-adsorption by injecting the urea, provided that an exhaust gas temperature detected by the second temperature sensor is equal to or higher than 150° C.

Advantageous Effect of Invention

According to the present invention, an exhaust gas purification device that is capable of reducing the amount of NOx emissions generated at the time of cold start can be realized.

DETAILED DESCRIPTION OF THE INVENTION

An embodiment of the present invention is described below in detail with reference to the drawings. Note that, unless otherwise specified, the vertical, lateral, and other positional relationships are based on the positional relationship shown in the drawings. The dimensional ratio of the drawings is not limited to the ratio shown in the drawings. However, the following embodiment is merely an example for describing the present invention, and the present invention is not limited thereto. Note that, in the specification of the present invention, notation of the numerical range, for example, "1 to 100" incorporates therein both the upper-limit value "100" and the lower-limit value "1." The same applies to notation of other numerical ranges.

Figure 1:
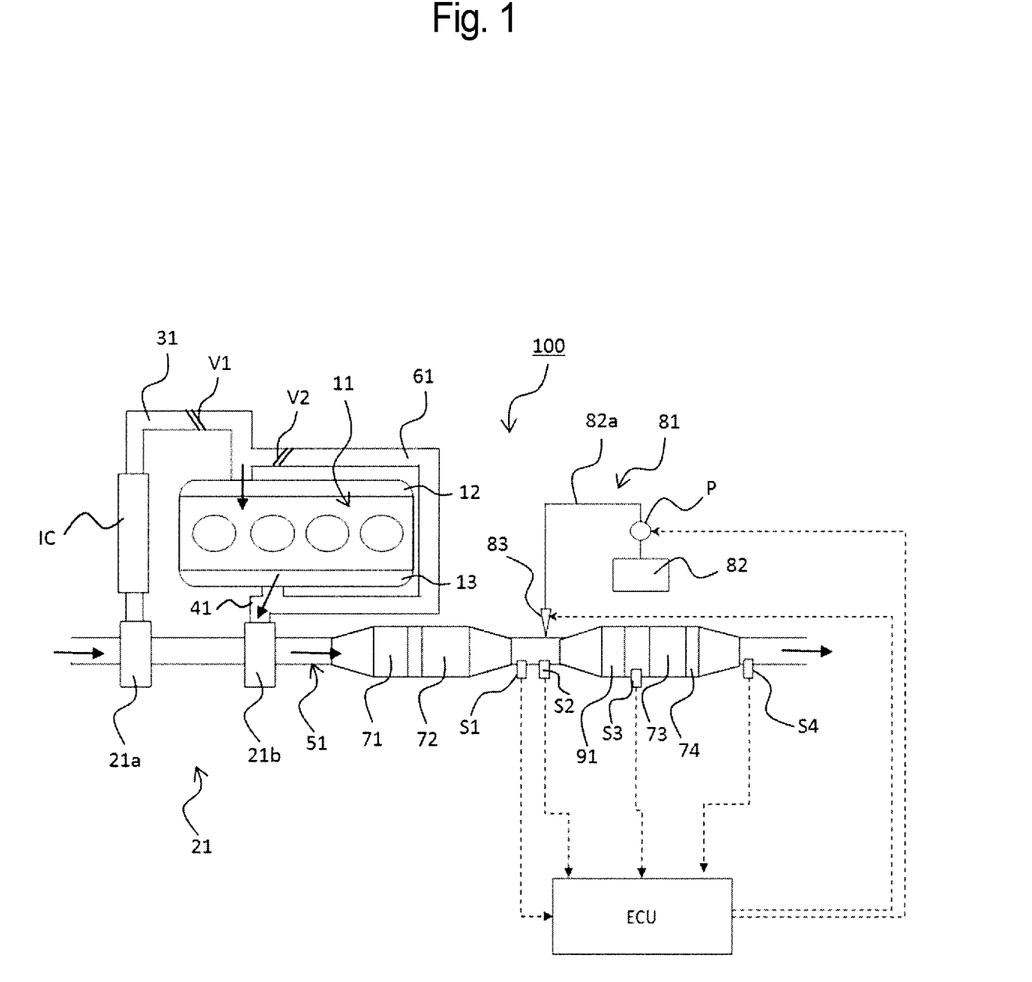
FIG. 1 is a schematic diagram showing a system configuration of an exhaust gas purification device according to the present embodiment.

FIG. 1 is a schematic diagram showing a system configuration of an exhaust gas purification device 100 according to the present embodiment. The exhaust gas purification device 100 includes an engine 11, a turbocharger 21 including a compressor 21a and an exhaust turbine 21b, an intercooler IC that cools intake air, an intake passage 31 connected to the engine 11, the turbocharger 21, and the intercooler IC, exhaust passages 41 and 51 connected to the engine 11 and the exhaust turbine 21b, through which exhaust gas emitted from the engine 11 passes, a valve V1 provided in the intake passage 31 to adjust the intake air amount into the engine 11, and a control unit ECU that controls driving of the engine 11 and controls the exhaust gas purification device 100 in its entirety.

The engine 11 used in the present embodiment is a so-called diesel engine with a turbocharger. The engine 11 includes an intake manifold 12 and an exhaust manifold 13. The intake manifold 12 is connected to an outlet of the compressor 21a of the turbocharger 21 through the intake passage 31. The exhaust manifold 13 is connected to an inlet of the exhaust turbine 21b of the turbocharger 21 through the exhaust passage 41. An outlet of the exhaust turbine 21b is connected to the exhaust passage 51. Exhaust gas from the engine 11 passes through the exhaust passage 41 and is emitted from the exhaust turbine 21b to the exhaust passage 51.

The engine 11 used in the present embodiment is additionally equipped with an exhaust-gas recirculation system. That is, an Exhaust Gas Recirculation (EGR) passage 61 that serves as a bypass passage is connected between the intake passage 31 and the exhaust passage 41. The EGR passage 61 is provided with an EGR valve V2 that adjusts the bypass amount. The EGR valve V2 is controlled such that part of exhaust gas bypasses the EGR passage 61 and returns to the engine 11. It is thus possible to adjust the exhaust gas temperature.

In the exhaust passage 51, a Diesel oxidation catalyst (DOC) 71 that oxidizes HC and NO contained in exhaust gas, a Diesel particulate filter (DPF) 72 that captures particulate matter contained in exhaust gas, a Selective Catalytic Reduction (SCR) catalyst 73 that reduces NOx in exhaust gas by using ammonia as a reductant, and an Ammonia oxidation catalyst (AMOX) 74 that oxidizes and removes excessive ammonia are provided in order from the upstream side to the downstream side.

The exhaust gas purification device 100 according to the present embodiment is equipped with a urea SCR system 81. The urea SCR system 81 supplies urea into the exhaust passage 51, causes ammonia produced by hydrolysis of the urea to be adsorbed onto the SCR catalyst 73, and causes NOx in exhaust gas to chemically react with the ammonia on the SCR catalyst 73 in order to selectively reduce NOx in exhaust gas. The urea SCR system 81 includes a tank 82 in which aqueous urea is stored, and a urea injection valve 83 connected to the tank 82 through an aqueous urea supply pipe 82a and a pump P. Aqueous urea in the tank 82 is pumped by the pump P, is then supplied to the urea injection valve 83 via the aqueous urea supply pipe 82a, and is injected into the exhaust passage 51 from the urea injection valve 83. In the present embodiment, the urea injection valve 83 is connected to the exhaust passage 51 between the DPF 72 and the SCR catalyst 73.

A metal honeycomb 91 is provided in the exhaust passage 51 on the downstream side of the urea injection valve 83 and on the upstream side of the SCR catalyst 73. The metal honeycomb 91 used here is an Electrically Heated Catalyst (EHC) with an SCR catalyst supported by the metal honeycomb body. The metal honeycomb 91 is capable of being electrically heated by control executed by the control unit ECU. It is thus possible to control the temperature of exhaust gas passing through the exhaust passage 51 by heat generation in the metal honeycomb 91. In the present embodiment, a heat-insulating material is provided (not shown) on the outer periphery of the exhaust passage 51 along the entire length of the exhaust passage 51. Any of the heat-insulating materials commonly known in the art can be appropriately selected and used. The heat-insulating material is not particularly limited. However, it is preferable to use a heat-insulating material of, for example, cellulose fiber or rock wool. The heat-insulating material is provided on the outer periphery of the exhaust passage 51 as described above at least on the downstream side of the urea injection valve 83 and on the upstream side of the SCR catalyst 73, so that adjustment of the exhaust gas temperature by heat generation in the metal honeycomb 91 can be performed more efficiently.

The electrically-heated metal honeycomb 91 is heated by a jacket-type electrical heater attached to the outer periphery of the metal honeycomb body, and by a coil-type electrical heater attached in such a manner as to be partially embedded into the metal honeycomb body (both are not shown) in the present embodiment. These electrical heaters are electrically connected to the ECU and an on-board power supply (not shown). By controlling an output of these electrical heaters, it is possible to control the temperature of the metal honeycomb 91, and consequently, the exhaust gas temperature in the exhaust passage 51.

Urea injected from the urea injection valve 83 into the exhaust passage 51 undergoes hydrolysis in the exhaust passage 51 and becomes ammonia. The urea injected in the manner as described above and/or the ammonia produced in the manner as described above is adsorbed onto the electrically-heated metal honeycomb 91 that is an EHC and onto the SCR catalyst 73 on the downstream side of the metal honeycomb 91. While the reactivity of urea hydrolysis reaction may vary depending on the concentration of aqueous urea, the composition, pH, and the like, it is possible to control the reactivity efficiently by controlling the exhaust gas temperature in the exhaust passage 51. At this time, by controlling the heating of the electrically-heated metal honeycomb 91 described above, it is possible to closely control the reactivity regardless of the operating state of the engine 11.

Note that, heating of the metal honeycomb 91 can also be performed by energizing the metal honeycomb body and thereby causing the metal honeycomb itself to directly generate heat. In this case, the metal honeycomb 91 is connected to the on-board power supply, and the control unit ECU controls the output of the power supply to thereby control the temperature of the metal honeycomb 91, and consequently, the exhaust gas temperature in the exhaust passage 51. In this case, the control unit ECU functions as a heating control unit.

The exhaust passage 51 is provided with a temperature sensor, a NOx sensor, and the like at their respective locations. In the present embodiment, a NOx sensor S1 and a temperature sensor S2 are provided on the exhaust passage 51 between the DPF 72 and the urea injection valve 83. The NOx sensor S1 detects a NOx concentration in exhaust gas having passed through the DPF 72. The temperature sensor S2 detects a temperature of the exhaust gas. A temperature sensor S3 is also provided on the exhaust passage 51 between the metal honeycomb 91 and the SCR catalyst 73. The temperature sensor S3 detects an exhaust gas temperature of exhaust gas having passed through the metal honeycomb 91. Furthermore, a NOx sensor S4 is provided on the exhaust passage 51 on the downstream side of the AMOX 74. The NOx sensor S4 detects a NOx concentration in exhaust gas having passed through the AMOX 74. These types of sensors are electrically connected to the ECU to monitor the temperature of exhaust gas passing through the exhaust passage 51, and the NOx concentration in the exhaust gas as needed.

The control unit ECU controls driving of the engine 11 and controls the exhaust gas purification device 100 in its entirety. The control unit ECU is a computer made up of a Central Processing Unit (CPU), a storage unit, specifically, a Read Only Memory (ROM) and a Random Access Memory (RAM), and other units, although illustrations of these units are omitted. In the present embodiment, the control unit ECU is electrically connected to the urea injection valve 83, the pump P, the electrical heater for the electrically-heated metal honeycomb 91, the valve V1, the EGR valve V2, and the like. The control unit ECU calculates an injection amount In of urea to be injected from the urea injection valve 83 into the exhaust passage 51, executes control to inject the calculated amount of urea from the urea injection valve 83, and controls electrical heating of the electrically-heated metal honeycomb 91 using the electrical heater.

Conventionally, urea injection from the urea injection valve 83 into the exhaust passage 51 is performed, provided that the temperature of exhaust gas passing through the exhaust passage 51 is equal to or higher than a temperature at which it is possible for hydrolysis of urea to occur (for example, 150 to 170° C. or higher) in view of preventing injector clogging, catalyst clogging, and the like caused by adhesion of urea, ammonium nitrate, and reaction product between these substances and exhaust gas. Consequently, a large amount of NOx is emitted, for example, at the time of cold start after the engine stop, or at the time of low-load start during real driving or within the low-temperature range in the first half of the WHTC mode, at which the exhaust gas temperature is below 150° C. (hereinafter, these times are collectively referred to as "the time of cold start").

In contrast to this, in the present embodiment, in order to reduce the amount of NOx emissions at the time of cold start as described above, an ammonia pre-adsorption control system and an assist-heating control system at the time of cold start are equipped. These systems are described below in detail.

Figure 2:
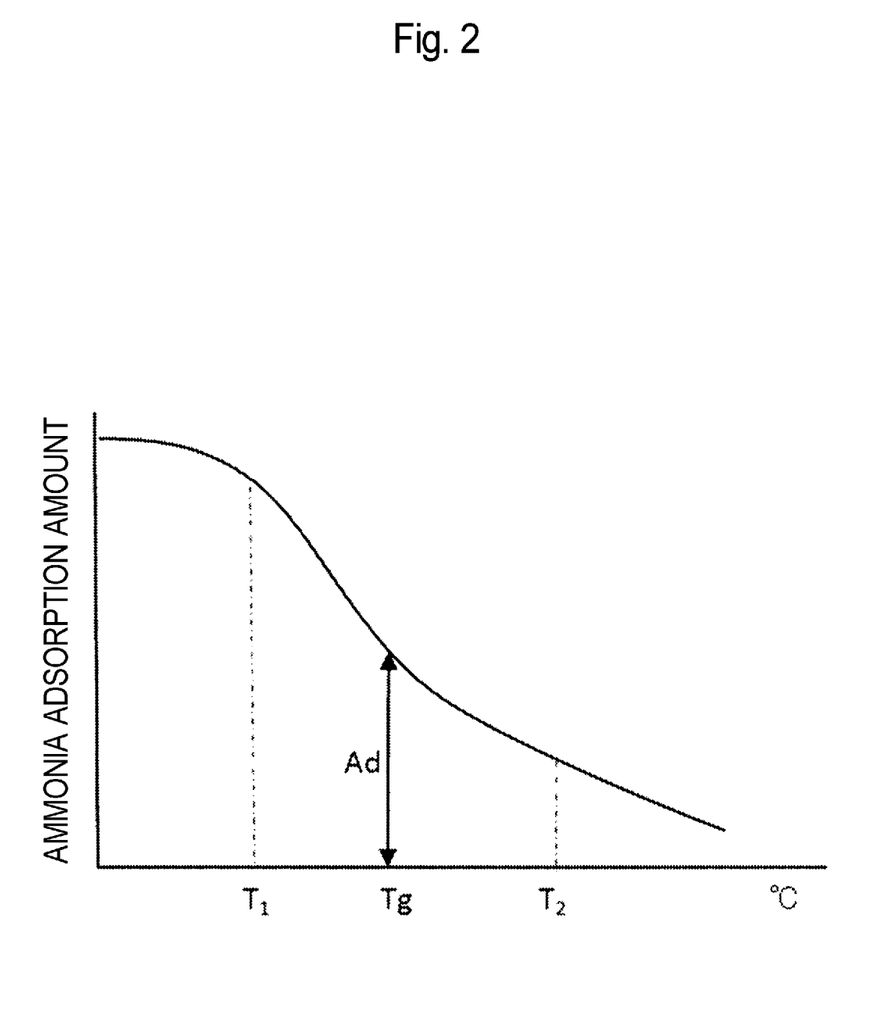
FIG. 2 is an explanatory diagram showing a temperature-versus-ammonia adsorption amount profile for an electrically-heated metal honeycomb and an SCR catalyst in the exhaust gas purification device according to the present embodiment, and showing a maximum ammonia adsorption amount Ad at a set temperature Tg.

The storage unit of the control unit ECU according to the present embodiment has stored therein the temperature-versus-ammonia adsorption amount profile for the metal honeycomb 91 that is an EHC and the SCR catalyst 73 described above. FIG. 2 is a graph showing an example of the temperature-versus-ammonia adsorption amount profile. As shown in FIG. 2, the amount of ammonia adsorbed onto the SCR catalyst (including the metal honeycomb 91 that is an EHC and the SCR catalyst 73) has dependency on temperature. As the temperature increases, the ammonia adsorption amount decreases.

In the present embodiment, the control unit ECU detects an exhaust gas temperature of exhaust gas passing through the metal honeycomb 91 from the temperature sensor S3 located at the same position as, or on the downstream side of, the metal honeycomb 91. Based on this detected temperature Tg and the temperature-versus-ammonia adsorption amount profile, the control unit ECU calculates the injection amount In of urea, which is equivalent to the amount of ammonia to be pre-adsorbed onto the metal honeycomb 91 and the SCR catalyst 73. The control unit ECU then injects the calculated amount of urea from the urea injection valve 83 so as to cause ammonia to be pre-adsorbed onto the metal honeycomb 91 and the SCR catalyst 73. Aqueous urea may be injected directly from the urea injection valve 83. However, a small-sized ceramic heater or the like may be mounted immediately below the urea injection valve 83 to heat a spray of aqueous urea injected from the urea injection valve 83 so as to promote thermal decomposition of the urea into ammonia, and then supply the urea or the ammonia to the metal honeycomb 91 and the SCR catalyst 73.

Note that, ammonia pre-adsorption described herein means that ammonia has been adsorbed in advance onto the metal honeycomb 91 and the SCR catalyst 73 at a reference time, where the time of cold start that occurs after the pre-adsorption is defined as the reference time, at which the exhaust gas temperature is lower than 150° C. Such ammonia pre-adsorption as described above is performed, which provides supplemental ammonia supply at the time of cold start when urea injection is difficult, and thus the amount of NOx emissions at the time of cold start can be reduced. As a result of this, the total amount of NOx emitted from the engine 11 can be reduced. Note that, in the present embodiment, while the temperature to determine whether it is cold start is set below 150° C., the set temperature is not limited thereto. The temperature to determine whether it is cold start can be appropriately set, and is preferably set to 120° C. or lower.

The injection amount In of urea can be calculated in the following manner. For example, the exhaust gas temperature of exhaust gas passing through the metal honeycomb 91 is detected from the temperature sensor S3, and based on this detected temperature Tg and the temperature-versus-ammonia adsorption amount profile, the maximum ammonia adsorption amount Ad is read. The urea amount, which is equivalent to, for example 30 to 100%, more preferably 40% to 95%, or further preferably 50 to 90% of this maximum ammonia adsorption amount Ad, is calculated as the injection amount In described above. Note that, this calculation of the injection amount In can be performed by various methods commonly known. The calculation method is not particularly limited. For example, the calculation of the injection amount In can also be performed by the method described in the conventional technique. Specifically, based on the engine rotational speed, the fuel injection amount, the intake air amount, the NOx concentration detected by the NOx sensors S1 and S4, and the like, and further by correcting the temperature, the amount of NOx reduced by the SCR catalyst is obtained, and thereafter the amount of ammonia adsorbed onto a SCR catalyst 22 is calculated in order to calculate the urea amount equivalent to the shortage of the ammonia adsorption amount.

The control unit ECU electrically heats the electrically-heated metal honeycomb 91 when the exhaust gas temperature is lower than 150° C. at the time of cold start after ammonia pre-adsorption. Such assist-heating as described above is performed, which helps the exhaust gas temperature to sharply increase after the cold start. Accordingly, the exhaust gas temperature can be increased to a high temperature earlier. Moreover, the exhaust gas temperature is increased to a high temperature earlier by performing the assist-heating as described above, which improves the efficiency in NOx reduction by ammonia. This can also improve the NOx purification rate.

Figure 3:
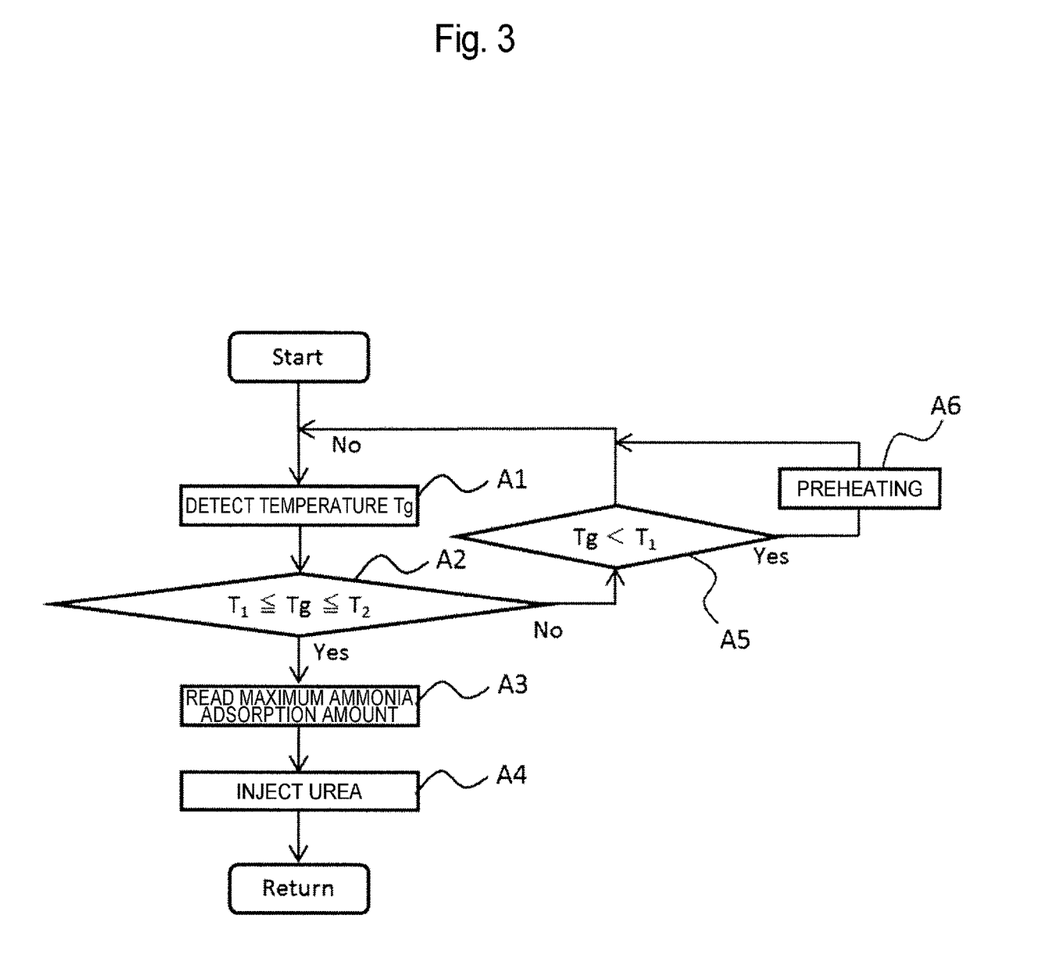
FIG. 3 is a flowchart showing an example of ammonia pre-adsorption control in the exhaust gas purification device according to the present embodiment.

FIG. 3 is a flowchart showing an example of ammonia pre-adsorption control to be executed by the control unit ECU in the present embodiment. In this flowchart, first the control unit ECU detects the temperature Tg (° C.) of exhaust gas passing through the metal honeycomb 91 based on a value output from the temperature sensor S3 (step A1).

Next, the control unit ECU determines whether the detected temperature Tg (° C.) falls within the temperature range from a predetermined set temperature $T_1$ (° C.) or higher to a predetermined set temperature $T_2$ (° C.) or lower (step A2). In the present embodiment, the temperature $T_1$ is set to 170° C. and the temperature $T_2$ is set to 300° C. These set temperatures can be appropriately determined, and are not particularly limited. In the normal usage environment, the temperature $T_1$ preferably falls within the range from 160 to 220° C., and more preferably falls within the range from 170 to 210° C., and the temperature $T_2$ preferably falls within the range from 240 to 350° C., and more preferably falls within the range from 250 to 330° C.

When the determination is Yes in step A2, the control unit ECU reads the maximum ammonia adsorption amount Ad at the corresponding temperature Tg based on the temperature-versus-ammonia adsorption amount profile as described above (step A3). Thereafter, the control unit ECU calculates the injection amount In of urea, which is equivalent to the amount of ammonia to be pre-adsorbed onto the metal honeycomb 91 and the SCR catalyst 73 based on this maximum ammonia adsorption amount Ad, and injects the calculated amount of urea from the urea injection valve 83 (step A4) to perform ammonia pre-adsorption. Thereafter, the control unit ECU completes the process once.

When the determination is No in step A2, the control unit ECU determines whether the detected temperature Tg is below the predetermined set temperature $T_1$ (° C.) (step A5). When the determination is No in step A5, the control unit ECU determines that the engine 11 is in a medium-load to high-load operating state. The control unit ECU again performs the processes in steps A1 and A2 repeatedly and does not perform ammonia pre-adsorption until the determination is Yes in step A2.

In contrast, when the determination is Yes in step A5, the control unit ECU determines that the exhaust gas temperature is in a low-temperature state that is not suitable for ammonia pre-adsorption, and thus performs preheating in order to increase the exhaust gas temperature (step A6). The method for this preheating is not particularly limited. However, the preheating is performed preferably by electrical heating of the electrically-heated metal honeycomb 91, or by injection control for performing post-injection, after-injection, and the like for a predetermined time, by flow-rate control for controlling the opening of an intake valve V so as to decrease the intake air amount, or the like. The post-injection and the after-injection refer to sub-injection to be performed after the main injection that is the main fuel injection. Preferably, the preheating continues to be performed until the metal honeycomb 91 reaches the temperature suitable for ammonia pre-adsorption. For example, the preheating preferably continues to be performed until the metal honeycomb 91 falls within the temperature range from the set temperature $T_1$ (° C.) or higher to the set temperature $T_2$ (° C.) or lower. After this preheating, the control unit ECU performs the processes in steps A1 and A2 again. When the determination is Yes in step A2, the control unit ECU performs ammonia pre-adsorption (steps A3 and A4). Thereafter, the control unit ECU completes the process once.

Note that, in the above explanations, the ammonia pre-adsorption control is described as an example in a case where the metal honeycomb 91 and the SCR catalyst 73 are in a fresh state, in other words, the amount of ammonia adsorbed onto the metal honeycomb 91 and the SCR catalyst 73 is zero. In a case where ammonia pre-adsorption according to the present invention has already been performed, or a case where the engine 11 has been already driven under the condition where the exhaust gas temperature exceeds the temperature Tg, and accordingly the originally-intended ammonia adsorption in the urea SCR system has already been performed, the amount of ammonia having already been adsorbed onto the metal honeycomb 91 and the SCR catalyst 73 may be taken into account to calculate the injection amount In of urea for ammonia pre-adsorption according to the present invention.

For example, before steps A1 and A2 described above, a prior process is performed to increase the temperature Tg of exhaust gas passing through the metal honeycomb 91 to a high temperature, for example, 400° C. or higher, preferably 500° C. or higher, with urea injection from the urea injection valve 83 being stopped. Provided that ammonia having already been adsorbed onto the metal honeycomb 91 and the SCR catalyst 73 is removed, steps A3 and A4 described above can be performed directly from the prior process. Alternatively, by using the conventionally known method, the amount of ammonia having already been adsorbed onto the metal honeycomb 91 and the SCR catalyst 73 at the detected temperature Tg is calculated, and this calculated amount of ammonia is subtracted from the maximum ammonia adsorption amount Ad described above to calculate the shortage of the ammonia adsorption amount. Thus, the urea amount, which is equivalent to this shortage of the ammonia adsorption amount, can be calculated as the injection amount In of urea to be conducted in steps A3 and A4.

Figure 4:
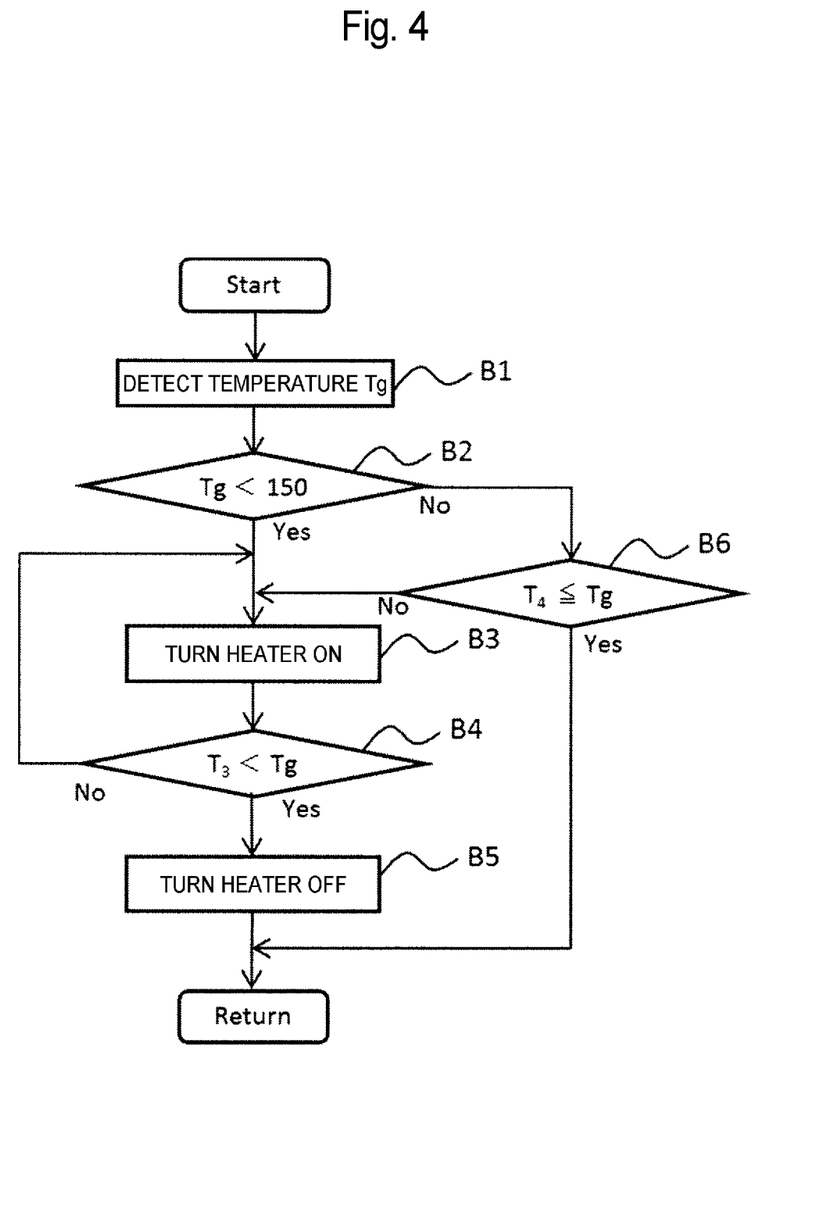
FIG. 4 is a flowchart showing an example of electrically heating control at the time of cold start in the exhaust gas purification device according to the present embodiment.

FIG. 4 is a flowchart showing an example of assist-heating control at the time of cold start to be executed by the control unit ECU in the present embodiment. Note that, the time of cold start after the engine stop, and the time of low-load start during real driving or within the low-temperature range in the first half of the WHTC mode, at which the exhaust gas temperature is relatively low, are collectively referred herein to as "the time of cold start." In this example, operation of the engine 11 in a state where the temperature Tg (° C.) of exhaust gas passing through the metal honeycomb 91, which is detected based on a value output from the temperature sensor S3, is below 150° C., more preferably, 120° C. or lower, is defined as cold start.

In this flowchart, first the control unit ECU detects the temperature Tg (° C.) of exhaust gas passing through the metal honeycomb 91 based on a value output from the temperature sensor S3 (step B1). The control unit ECU determines whether the detected temperature Tg (° C.) is below 150° C. (step B2).

When the determination is Yes in step B2, the control unit ECU determines that the detected temperature Tg (° C.) is a non-optimal temperature condition for NOx purification. The control unit ECU turns the electrical heater ON and adjusts output control of the electrical heater to electrically heat the metal honeycomb 91, that is, performs assist-heating on the metal honeycomb 91 (step B3). The temperature Tg of exhaust gas passing through the metal honeycomb 91 is increased by performing the assist-heating in the manner as described above. This improves the efficiency in NOx reduction by ammonia.

The assist-heating in step B3 is continued until the temperature Tg detected from the temperature sensor S3 exceeds a predetermined set temperature $T_3$ (° C.) (step B4). When the temperature Tg detected from the temperature sensor S3 exceeds the predetermined set temperature $T_3$ (° C.) (step B4), the control unit ECU turns the electrical heater OFF to stop the assist-heating (step B5). The control unit ECU completes the process once. The set temperature $T_3$ (° C.) is 270° C. in this example, however, the set temperature $T_3$ (° C.) may be appropriately set, taking into account the degree of improvement in NOx purification rate due to the assist-heating, and the electrical usage needed for the electrical heating. The set temperature $T_3$ (° C.) is not particularly limited. Specifically, the set temperature $T_3$ (° C.) preferably falls within the temperature range from 200 to 300° C., more preferably falls within the temperature range from 210 to 280° C., and further preferably falls within the temperature range from 220 to 270° C.

In contrast, when the determination is No in step B2, the control unit ECU determines whether the detected temperature Tg (° C.) is equal to or higher than a predetermined set temperature $T_4$ (° C.) (step B6). When the detected temperature Tg (° C.) is below the predetermined set temperature $T_4$ (° C.) in step B6, the control unit ECU determines that the temperature is to be adjusted to a more optimal temperature condition for NOx purification. The control unit ECU turns the electrical heater ON and adjusts output control of the electrical heater to perform assist-heating on the metal honeycomb 91 (step B3). In this example, the set temperature $T_4$ (° C.) is equal to the set temperature $T_1$ (° C.), that is, 170° C., however, the set temperature $T_4$ (° C.) can be appropriately set in accordance with desired temperature control. The set temperature $T_4$ (° C.) is not particularly limited, but can be set to any temperature, for example, between 151 and 299° C. In contrast, when the determination is Yes in step B6, the control unit ECU completes the process once without turning the electrical heater ON.

Note that, in the sequence of processes described above, operation control for turning the electrical heater ON is executed in two stages, steps B2 and B6. However, multi-stage control in three or more stages (for example, three to 10-stage control) may be executed in order to more closely control the temperature. Alternatively, in a case where simpler temperature control is desired, step B6 can be omitted and single-stage control in step B2 alone can be executed. Similarly to the above, operation control for turning the electrical heater OFF is not limited to single-stage control in step B5 alone, but may be multistage control in two or more stages.

The set temperatures described above may be appropriately determined in accordance with desired temperature control, and are not particularly limited. However, these set temperatures preferably satisfy the relationship of $T_1 < T_3 \leq T_2$ (° C.). With such set temperatures as described above, a reduction in amount of NOx emissions at the time of cold start can be achieved without excessively increasing power consumption, and further without excessively decreasing the fuel efficiency when fuel injection control is executed. Note that, as an electrical-power supply to the electrical heater, for example, an alternator that converts part of the power of the engine 11 to electrical energy to generate electricity can be used, or various types of batteries such as a nickel-hydrogen cell and a lithium-ion cell can be used. The type of electrical-power supply is not particularly limited.

Figure 5:
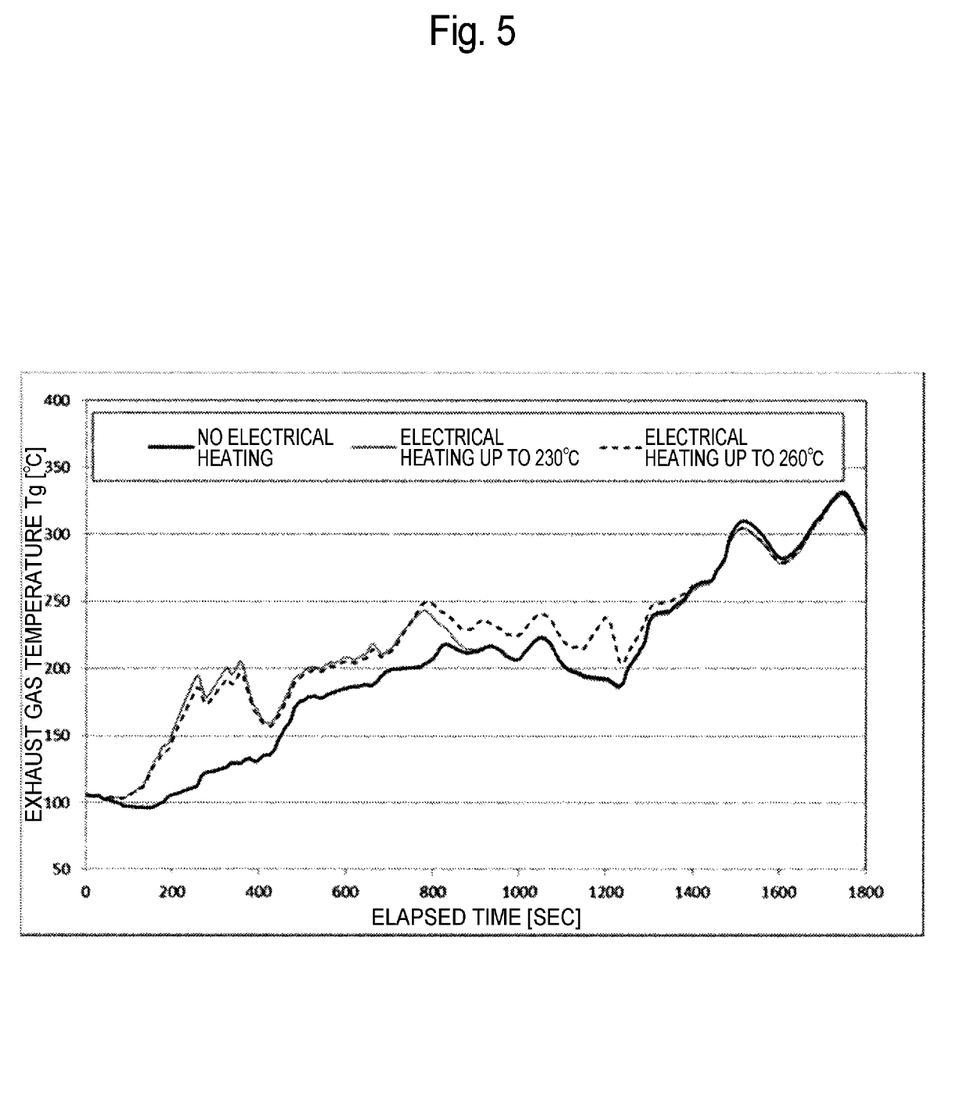
FIG. 5 is a graph showing variations in exhaust gas temperature in the WHTC mode (Reference Example 1, Example 1, and Example 2).

FIG. 5 is a graph showing variations in exhaust gas temperature in the WHTC mode. This graph shows a change in exhaust gas temperature measured when 30% of the maximum ammonia adsorption amount Ad at the temperature Tg of 200° C. is defined as the injection amount In, and the set temperatures are $T_1=170°$ C., $T_2=300°$ C., and $T_4=170°$ C., respectively.

As is apparent from FIG. 5, it is understood that, compared to the case where assist-heating control is not executed at the time of cold start (the bold line "no electrical heating" in FIG. 5, and hereinafter sometimes referred to as "Reference Example"), the exhaust gas temperature rises more sharply after the cold start, and the time required for the exhaust gas temperature to reach 200° C. is reduced by 50% from approximately 700 seconds to 350 seconds when assist-heating control is executed up to the set temperature $T_3=230°$ C. (the thin line "electrical heating up to 230° C." in FIG. 5, and hereinafter sometimes referred to as "Example 1"), and when assist-heating control is executed up to the set temperature $T_3=260°$ C. (the dotted line "electrical heating up to 260° C." in FIG. 5, and hereinafter sometimes referred to as "Example 2"). In Example 1 in which assist-heating control is executed up to the set temperature $T_3=230°$ C., an effect in increasing the exhaust gas temperature by the assist-heating control is observed in the first half to the midpoint (50 to 900 seconds) of the WHTC mode. In Example 2 in which assist-heating control is executed up to the set temperature $T_3=260°$ C., an effect in increasing the exhaust gas temperature by the assist-heating control is observed in the first half to the second half (50 to 1500 seconds) of the WHTC mode.

Figure 6:
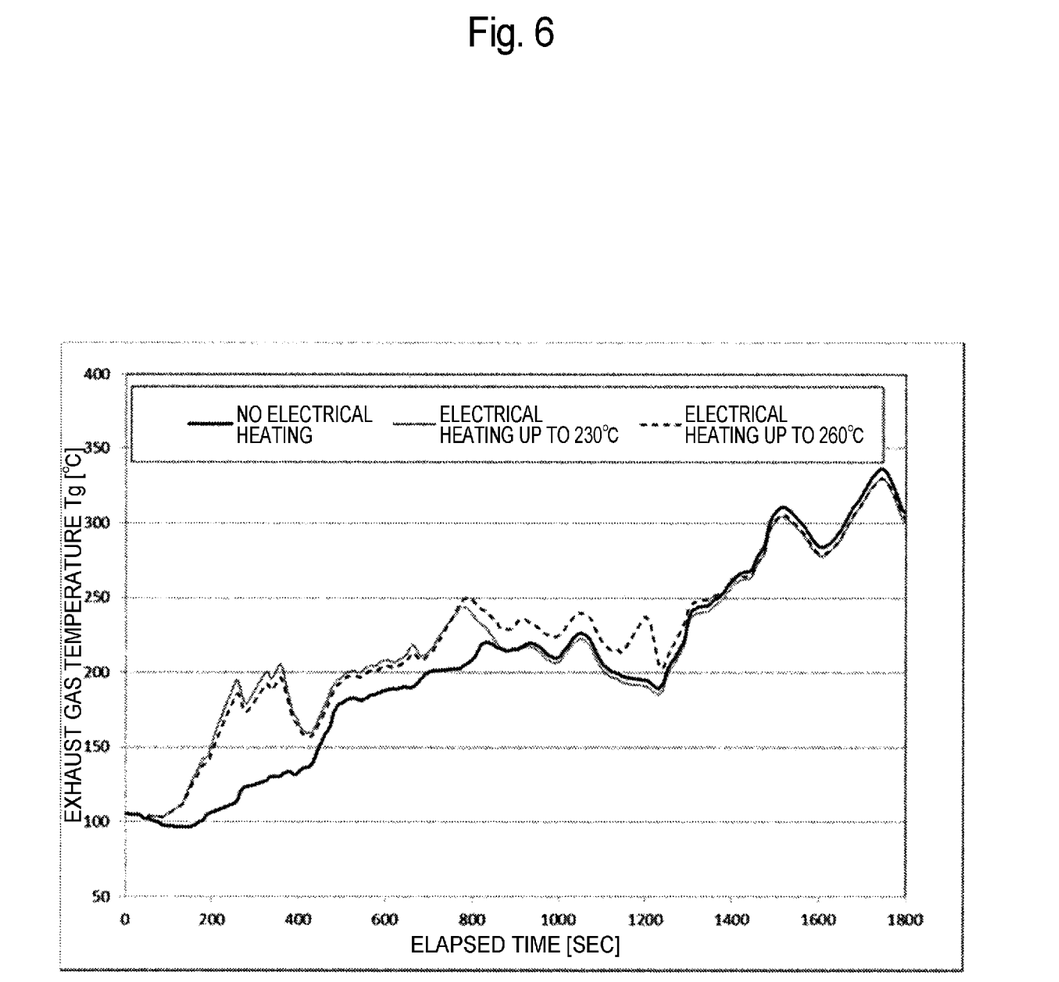
FIG. 6 is a graph showing variations in exhaust gas temperature in the WHTC mode (Reference Example 1, Example 3, and Example 4).

FIG. 6 is a graph showing variations in exhaust gas temperature in the WHTC mode. This graph shows a change in exhaust gas temperature measured when 100% of the maximum ammonia adsorption amount Ad at the temperature Tg of 200° C. is defined as the injection amount In, and the set temperatures are $T_1=170°$ C., $T_2=300°$ C., and $T_4=170°$ C., respectively.

As is apparent from FIG. 6, it is understood that compared to the case where assist-heating control is not executed at the time of cold start (the bold line "no electrical heating" in FIG. 6, and hereinafter sometimes referred to as "Reference Example"), the exhaust gas temperature rises more sharply after the cold start, and the time required for the exhaust gas temperature to reach 200° C. is reduced by 50% from approximately 700 seconds to 350 seconds when assist-heating control is executed up to the set temperature $T_3=230°$ C. (the thin line "electrical heating up to 230° C." in FIG. 6 and hereinafter sometimes referred to as "Example 3"), and when assist-heating control is executed up to the set temperature $T_3=260°$ C. (the dotted line "electrical heating up to 260° C." in FIG. 6, and hereinafter sometimes referred to as "Example 4"). In Example 3 in which assist-heating control is executed up to the set temperature $T_3=230°$ C., an effect in increasing the exhaust gas temperature by the assist-heating control is observed in the first half to the midpoint (50 to 900 seconds) of the WHTC mode. In Example 4 in which assist-heating control is executed up to the set temperature $T_3=260°$ C., an effect in increasing the exhaust gas temperature by the assist-heating control is observed in the first half to the second half (50 to 1500 seconds) of the WHTC mode.

Table 1 shows the NOx purification rate in the WHTC mode described above.

TABLE 1

|  | Pre-adsorption | Electrical heating | NOx purification rate |
| --- | --- | --- | --- |
| Reference Example | 0% | Not heated | 33% |
| Example 1 | 30% | Heated | 54% |
| Example 2 | 30% | Heated | 59% |
| Example 3 | 100% | Heated | 56% |
| Example 4 | 100% | Heated | 68% |

As is obvious also from Table 1, it is understood that the NOx purification rate has apparently improved by executing ammonia pre-adsorption control according to the present invention. It is further understood that the NOx purification rate has apparently improved by executing assist-heating control at the time of cold start according to the present invention. In view of these findings, either the ammonia pre-adsorption control according to the present invention or the assist-heating control at the time of cold start according to the present invention is regarded as effective to improve the NOx purification rate, if it is used alone.

It is also understood that the ammonia pre-adsorption control and the assist-heating control at the time of cold start according to the present invention are used in combination, which is further effective to improve the NOx purification rate.

A greater improvement in NOx purification rate is observed in Example 3 and Example 4 with 100% pre-adsorption, in which 100% of the maximum ammonia adsorption amount Ad is defined as the injection amount In, than in Example 1 and Example 2 with 30% pre-adsorption in which 30% of the maximum ammonia adsorption amount Ad is defined as the injection amount In. Moreover, when the extent of improvement in NOx purification rate is compared, the comparison between Example 2 and Example 4 shows a greater extent of improvement than the comparison between Example 1 and Example 3. Based on this, it is found that as a larger amount of ammonia is pre-adsorbed, the NOx purification rate improves to a greater extent, that is, the sensitivity is higher.

The preferred embodiment of the present invention has been described above in detail. However, the present invention is not limited to the specific embodiment described above. Any modifications and variations are possible within the scope of the present invention described in the claims.

For example, the present invention can employ a configuration in which only the metal honeycomb 91 that is an EHC is provided while the SCR catalyst 73 is omitted. In this case, only a temperature-versus-ammonia adsorption amount profile for the metal honeycomb 91 that is an EHC may be stored in the storage unit of the control unit ECU. The present invention can also employ a configuration in which the metal honeycomb 91 not supporting an SCR catalyst therein, in other words, the metal honeycomb 91 that is not an EHC, is arranged. In this case, only a temperature-versus-ammonia adsorption amount profile for the SCR catalyst 73 may be stored in the storage unit of the control unit ECU. Meanwhile, the present invention can also employ a configuration in which a plurality of SCR catalysts 73 are arranged on the downstream side of the metal honeycomb 91. In this case, a temperature-versus-ammonia adsorption amount profile for the metal honeycomb 91 that is an EHC and the SCR catalysts 73 of the control unit ECU.

It is also possible to execute the ammonia pre-adsorption control according to the present invention based on a second temperature sensor (the temperature sensor S2) that is provided on the upstream side of the metal honeycomb 91 and that detects an exhaust gas temperature of exhaust gas flowing into the metal honeycomb 91. Specifically, when the metal honeycomb 91 is electrically heated, the control unit ECU can perform pre-adsorption by injecting urea, provided that the exhaust gas temperature detected by the temperature sensor S2 is equal to or higher than 150° C. When the control unit ECU performs assist-heating on the metal honeycomb 91, the exhaust gas temperature detected by the temperature sensor S3 becomes higher than the exhaust gas temperature detected by the temperature sensor S2. Therefore, even though the control unit ECU executes the control as described above, it is still possible to properly activate the ammonia pre-adsorption control.

INDUSTRIAL APPLICABILITY

The present invention is widely and effectively applicable to various types of internal combustion engines equipped with a urea SCR system for purifying NOx contained in exhaust gas.

REFERENCE SIGNS LIST 11 engine
21a compressor
21b exhaust turbine
21 turbocharger
31 intake passage
41 exhaust passage
51 exhaust passage
12 intake manifold
13 exhaust manifold
61 EGR passage
71 DOC
72 DPF
73 SCR catalyst
74 AMOX
81 urea SCR system
82 tank
82a aqueous urea supply pipe
83 urea injection valve
91 metal honeycomb
100 exhaust gas purification device
ECU control unit
IC intercooler
V1 valve
V2 EGR valve
P pump
S1 NOx sensor
S2 temperature sensor
S3 temperature sensor
S4 NOx sensor

The invention claimed is:

1. An exhaust gas purification device at least comprising:
an exhaust passage through which exhaust gas from an engine passes;
a urea injection valve that injects urea into the exhaust passage;
an SCR catalyst provided in the exhaust passage on a downstream side of the urea injection valve;
an electrically-heated metal honeycomb provided in the exhaust passage on the downstream side of the urea injection valve and on an upstream side of the SCR catalyst, and capable of increasing an exhaust gas temperature;
a temperature sensor that detects the exhaust gas temperature of exhaust gas passing through the electrically-heated metal honeycomb;
a storage unit having stored therein a temperature-versus-ammonia adsorption amount profile for the electrically-heated metal honeycomb and the SCR catalyst; and
a control unit that calculates an injection amount In of the urea, which is equivalent to an amount of ammonia to be pre-adsorbed onto the electrically-heated metal honeycomb and the SCR catalyst, based on the temperature-versus-ammonia adsorption amount profile, injects the calculated amount In of the urea from the urea injection valve to cause ammonia to be pre-adsorbed onto the electrically-heated metal honeycomb and the SCR catalyst, and electrically heats the electrically-heated metal honeycomb at a time of cold start when the exhaust gas temperature is lower than 150° C.,
wherein the control unit reads a maximum ammonia adsorption amount Ad for the electrically-heated metal honeycomb and the SCR catalyst at a predetermined set temperature Tg° C. from the storage unit, and calculates a urea amount equivalent to 30 to 100% of the maximum ammonia adsorption amount Ad as the injection amount In, and
the ammonia has been adsorbed in advance onto the metal honeycomb and the SCR catalyst at the time of cold start when the exhaust gas temperature is lower than 150° C.

2. The exhaust gas purification device according to claim 1, wherein the control unit electrically heats the electrically-heated metal honeycomb until the exhaust gas temperature falls within a temperature range from a predetermined set temperature $T_1$° C. or higher to a predetermined set temperature $T_2$° C. or lower.

3. The exhaust gas purification device according to claim 2, wherein the control unit executes preheating control to increase the exhaust gas temperature when the exhaust gas temperature is below the predetermined set temperature $T_1$ at a time of the pre-adsorption.

4. The exhaust gas purification device according to claim 2, wherein the control unit executes preheating control to electrically heat the electrically-heated metal honeycomb so as to increase the exhaust gas temperature when the exhaust gas temperature is below the predetermined set temperature $T_1$ at a time of the pre-adsorption.

5. The exhaust gas purification device according to claim 1, wherein the control unit stops electrically heating the electrically-heated metal honeycomb when the exhaust gas temperature exceeds a predetermined set temperature $T_3$° C.

6. The exhaust gas purification device according to claim 1, wherein the control unit electrically heats the electrically-heated metal honeycomb until the exhaust gas temperature falls within a temperature range from a predetermined set temperature $T_1$° C. or higher to a predetermined set temperature $T_2$° C. or lower, and stops electrically heating the electrically-heated metal honeycomb when the exhaust gas temperature exceeds a predetermined set temperature $T_3$° C., and the set temperatures satisfy a relationship of $T_1 < T_3 \leq T_2$(° C.).

7. The exhaust gas purification device according to claim 1, wherein the electrically-heated metal honeycomb at least includes a metal honeycomb, and an SCR catalyst supported by the metal honeycomb.

8. The exhaust gas purification device according to claim 1, wherein the electrically-heated metal honeycomb at least includes a metal honeycomb, and a jacket-type electrical heater attached to the metal honeycomb and/or a coil-type electrical heater partially embedded into the metal honeycomb.

9. The exhaust gas purification device according to claim 1, wherein the electrically-heated metal honeycomb at least includes a metal honeycomb, and a heating control unit that energizes the metal honeycomb to cause the metal honeycomb to generate heat.

10. The exhaust gas purification device according to claim 1, wherein the exhaust passage is provided with a heat-insulating material on an outer periphery of the exhaust passage at least on the downstream side of the urea injection valve and on the upstream side of the SCR catalyst.

11. The exhaust gas purification device according to claim 1, further comprising a second temperature sensor that detects the exhaust gas temperature of exhaust gas flowing into the electrically-heated metal honeycomb on the upstream side of the electrically-heated metal honeycomb, wherein
when the electrically-heated metal honeycomb is electrically heated, the control unit performs pre-adsorption by injecting the urea, provided that the exhaust gas temperature detected by the second temperature sensor is equal to or higher than 150° C.

12. The exhaust gas purification device according to claim 1, wherein the engine is a diesel engine.

* * * * *